July 11, 1944.   M. E. BENESH   2,353,287
METHOD OF DETECTING AND MEASURING LEAKAGE IN GAS LINES
Filed Oct. 9, 1940
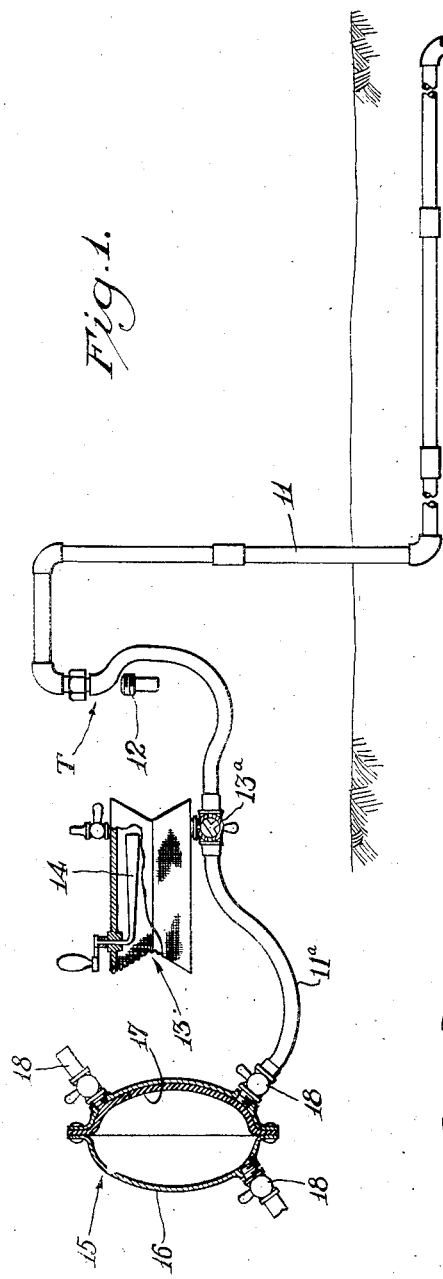
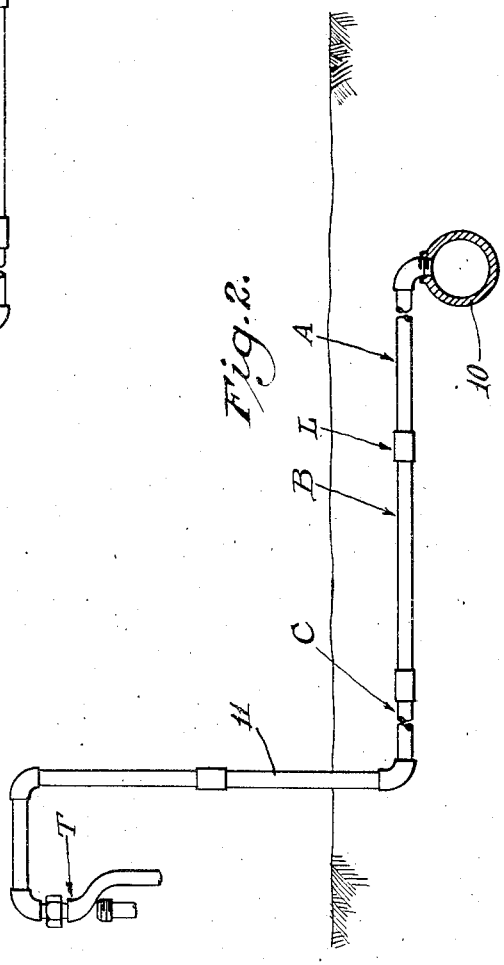
Inventor
Matthew E. Benesh
By
Parker, Carlson, Pitzner & Hubbard
Attorneys.

Patented July 11, 1944

2,353,287

UNITED STATES PATENT OFFICE 2,353,287

METHOD OF DETECTING AND MEASURING LEAKAGE IN GAS LINES

Matthew E. Benesh, Cicero, Ill., assignor to Chicago By-Products Corporation, Chicago, Ill., a corporation of Illinois Application October 9, 1940, Serial No. 360,456

8 Claims. (Cl. 137—77)

The invention relates to methods of detecting leakage and measuring the extent thereof in gas service lines, and the general aim of the invention is to provide a new and improved method which is simple to carry out, is exceptionally effective and accurate and may be performed without in any manner affecting or disturbing the normal operative condition of the service line.

An object is to provide a novel method of this nature which not only enables the operator to detect leakage, but permits the determination with a high degree of accuracy of the rate of gas loss and with fair accuracy the point or points in the service line at which leakage occurs.

More particularly stated, an object of the invention is to provide a new and improved method of detecting gas leakage which includes the step of determining the extent of the dilution of an indicator gas in the service line by a leak-induced flow of gas from the supply main into the service line.

Other objects and advantages will become apparent in the following description and from the accompanying drawing in which:

Figure 1 is a diagrammatic illustration of a service line having representative means associated therewith for performing the steps of my new process.

Fig. 2 is a diagram to which reference will be had in considering the methods of locating a leak in a service line.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For convenience in disclosing the present invention, reference will be had to the diagrammatic representation in Fig. 1 of a conventional commercial system for supplying illuminating gas to a user. In such a system a supply main 10 has a plurality of service lines 11 (only one of which is shown) leading into the consumers' establishments where each service line is connected with an intake pipe 12 to a meter (not shown). The present invention will be considered in the environment of such a system and for convenience it will be presumed that the service line through which gas flows from the supply main to the meter is to be checked for leakage.

According to the present invention, leakage of gas, as well as the rate of leakage, is detected by enabling the dilution of a known type of gas, by the flow of gas from the supply main caused by a leak or by leaks in the section of line being tested, the known type of gas being one which has physical or chemical characteristics different from those of the original or commercial gas from the supply main. The extent of such dilution in a given period of time will enable the determination with a high degree of accuracy of the rate of leakage and a series of comparative tests will locate the leak with reasonable certainty.

To perform the steps of the present method, the only change in the normal condition of the system is to open the service line to be checked at the meter. (If a longer or shorter length of the service line is to be checked, the line will be opened at a corresponding point along its length.) The operator then connects a conduit 11$^a$ to the service line at such point, which conduit leads to means of a suitable and conventional character for withdrawing a quantity of gas from the service line. In the drawing, such means is diagrammatically shown as being a bellows device 13 equipped with mixing or agitating means 14. A control valve 13$^a$ is provided for selectively placing the mixing device 13 in communication with the pipe 11 through the conduit 11$^a$, the control valve being also adapted, as will be hereinafter described, to place the mixing device in communication with a measuring device or to isolate it from the system. The volumetric capacity of the bellows is preferably several times that of the service line between the main and the point at which the bellows device is connected.

A measuring device 15 of suitable form is also employed to enable the operator to obtain a known or definite quantity of gas in a volume that is somewhat greater than the volume of the service line to be checked. For example, the operator may use such a structure as a closed casing, showing diagrammatically at 16, having an internal flexible diaphragm 17 arranged to abut one casing wall and to define with the opposite wall an internal chamber of known volume. Nipples 18 or the like, lead to the chambers on each side of the diaphragm to permit gas to flow into and out of the chambers and to permit samples to be taken. To this end one of the nipples 18 is connected with a section of the conduit 11$^a$ leading from the control valve 13$^a$. The equipment which has been described is all that is required to enable the operator to perform the steps of the present process except that suitable sampling flasks or the like and adequate apparatus for accurate gas analysis is necessary.

Initially the operator makes certain that gas is flowing through the supply main past the connection therewith of the service line to be tested. The bellows device is connected with the service line at the point where the line is opened and is filled with gas drawn from the service line and supply main. To this gas is added a quantity of what may be termed an "indicator medium" to produce the known type of gas which is to be used in the actual detection of leakage. Since the purpose of the indicator medium is to change the physical or chemical characteristics of the original gas in such a way that the quantity of the original gas and medium mixture can be definitely ascertained by analysis, almost any gaseous or vapor medium other than the original gas may be employed. A few examples of the many substances that may be used are hydrogen, chloroform, ether, nitrogen, pentane and butane, or any individual constituent of the original gas if the latter be a mixture of gases. The important factors are that the selected indicating medium should mix well with the original gas without condensing or otherwise separating therefrom or reacting therewith, and that the quantity thereof may be accurately determined by some method of quantitative analysis.

After the indicator medium has been added to the gas in the bellows device 13 and thoroughly mixed therewith by means of the agitator 14, the measuring device 15 is filled with the mixture. For convenience, the mixture will hereinafter be referred to as the indicator gas or simply as the indicator.

Having completed the preliminary steps of producing an indicator gas and segregating in the measuring device a known volume thereof which is greater than that of the service line to be checked, the operator expels all of the indicator gas from the measuring device into the service line, thereby purging the service line of original main gas and filling it with indicator gas. The volume of indicator gas delivered to the service line being greater than that of the line, some of the indicator gas will be forced into the supply main, but since gas is flowing through the main the excess entering the main will be instantly carried away from the mouth of the service line. In effect, therefore, only the service line is filled with the indicator gas.

Immediately following the discharge of the measured volume of indicator gas into the service line, the flow is reversed and the same volume of gas is withdrawn from the service line into the measuring device. While a certain quantity of original gas from the main will be drawn back into the measuring device to replace the quantity that was discharged into the supply main, this dilution does not have an adverse effect but on the contrary insures the return to the measuring device of all of the indicator gas from one end of the service line to the other. When the measuring device has been refilled with the original volume a true (well mixed) sample is taken of the gas therein.

The step of the process just described provides a standard against which comparisons of other samples may be made. This step is then repeated by filling the measuring device with the same known volume of indicator gas, discharging that volume of gas into the service line, and withdrawing that volume of gas from the service line into the measuring device. But in this step a measured time interval (usually a matter of a few minutes) is allowed to elapse between the time the service line is filled with indicator gas and the withdrawal of the gas therefrom. A true sample of the gas in the measuring device at the end of the second step is then taken. Any suitable analytical equipment or process may be used to determine the quantity of the indicator in the several samples, such as by a density balance, by thermal conductivity, or by a refractometer.

It is to be understood that in performing each repeated series of steps the time of filling and the time of withdrawal should be the same for all steps. In other words, all similar operations, with the exception of the intentionally introduced time interval, should be carried out under the same conditions.

Quantitative analysis of the two samples will determine whether leakage exists in the service line, and the difference between the two samples will enable the determination of the rate of leakage. Thus, if the second sample (which was taken after the indicator gas had remained in the service line an intentionally introduced interval of time) is the same as the first sample, no leakage has occurred. On the other hand, if the second sample contains a less quantity of indicator gas than the first sample, the difference is caused by the loss of indicator gas through the leak in the service line, the indicator gas having been forced through the leak by the pressure of the original gas in the supply main. The resulting dilution of the indicator gas in the second sample is therefore a direct measure of the quantity of gas that will escape through the leak under normal service conditions in the given period of time. The rate of leakage may therefore be easily calculated and the operator can readily determine whether the leak is of such nature as to necessitate repair or replacement of the service line.

The process which has been described will enable the operator to determine the rate of leakage. Successive tests of the same nature may be employed to locate the leak with a fair degree of accuracy. Referring to Fig. 2, it will be presumed that the operator has obtained the first and second samples and has determined that a leak is present in the service line. It will also be presumed that the operator in the second test has allowed an interval of one minute to elapse between the filling and emptying of the service line. To locate the leak the operator again repeats the process of filling and emptying the service line, but on this test a greater time interval, say two minutes, is allowed to elapse before the indicator gas is withdrawn. Normally, the dilution of the indicator gas in the third sample would be just twice the dilution of the second sample. If this is found to be the case upon quantitative analysis of the third sample, the operator knows that the incoming diluting gas from the supply main has not reached the leak in the time interval and therefore repeats the test again increasing the time interval.

On the other hand, if a comparison of the analyses of the second and third samples shows that the dilution is less than it should be, the operator knows that in the additional time interval the diluting gas from the supply main has reached the point of leakage with the result that further dilution of the indicator gas has not occurred. Since the rate of flow through the leak per unit of time can be calculated, the operator may estimate the rate of flow of the original diluting gas into the service line and determine with reasonable accuracy the location of the leak. Thus, if the leak is at L in Fig. 2, and a comparison of the first and second samples indicates that the incoming diluting gas from the supply main has reached the point A on the service line in one minute, the operator knows that in two minutes the diluting gas should reach point B. However, should the discrepancy between the expected dilution of the third sample and the actual dilution indicate that the third sample has been diluted by about two-thirds of the expected dilution, the leak will be located as being approximately two-thirds of the distance from point A to point B.

Another method of determining the location of a leak after the first and second samples have been taken and compared, is as follows: The operator fills the service line with indicator gas and then immediately withdraws a portion of the indicator gas, the withdrawn portion being estimated as a fraction of the calculated volume of the service line. For example, the operator may withdraw an estimated one-half of the total volume of the service line. Thus, the service line between the testing point indicated T and its approximate center designated C, will be filled with indicator gas and the remaining portion of the service line with ordinary gas from the supply main. The same result may be achieved by initially introducing into the service line only that volume of indicator gas required to fill it as far as its central point C.

In either event, first and second samples will be taken (the second sample after a given time interval has elapsed between filling the pipe and withdrawing the gas) and the analyses of the samples compared. If dilution has occurred the leak is located as being between points C and T, otherwise the leak is between the point C and the supply main. Having once determined the half section of the service line in which the leak is located, the operator may repeat the process, this time testing a predetermined fraction of the half of the supply line that leaks. A series of tests of this nature will enable the operator to determine the location of the leak.

Should the service line leak at more than one point, that fact will become apparent from the discrepancies in the dilutions of a series of samples. For example, when a single leak has been located, further dilution of the indicator gas, caused by its escape through that leak, will cease. If more than one leak is in the line, the rate at which dilution occurs will change when the operator tests at time intervals that will bring the head of the incoming gas from the service line between spaced points of leakage.

It will be evident from the foregoing that a novel and convenient method of locating leaks in gas conduits or lines has been provided. The present method does not involve the introduction of any object into the line to be tested, nor does it require that the line be exposed at any point other than that at which the bellows device and the measuring device are connected. It has been ascertained that where the quantitative analyses of the samples are accurate, the present method will detect leaks as small as one through which about fifty cents worth of illuminating gas per year will escape.

I claim as my invention:

1. The method of detecting leakage of gas in service lines connected with a supply main which includes the steps of filling the line to be tested with an indicator gas differing from the gas in the service line by a characteristic capable of being quantitatively ascertained, immediately withdrawing the indicator gas from said line, repeating the filling and withdrawal operation allowing a given time interval to elapse between the filling and withdrawal steps, and determining as to leakage by a comparison of the quantities of indicator gas present in the withdrawn gases.

2. The method of detecting leakage of gas in service lines leading to a supply main which includes the steps of introducing into the service line at a point remote from the supply main a known quantity of a gas which differs from the supply main gas by a characteristic that may be quantitatively determined, the quantity of gas introduced being in excess of that required to fill said service line between said point and the supply main, flowing gas through the supply main to remove the excess of the introduced gas from the mouth of the service line, immediately withdrawing the introduced gas from the service line plus that volume of supply main gas required to equal the known volume introduced, repeating the operation aforesaid with a predetermined time interval between the introducing and withdrawing steps, and comparing quantitatively the introduced gas remaining in the withdrawn gas after each withdrawal step.

3. The method of detecting leakage from a gas line as well as the location of such leakage which includes the steps of determining the extent of the dilution of an indicator gas in said line resulting from the loss of indicator gas through the leak and the replacement thereof by another gas during a predetermined time interval, similarly determining the dilution at different time intervals until a variance in the rate of dilution per unit of time occurs and determining the point of leakage by a consideration of the relation between the dilution occurring during the last time interval and the volumetric capacity of the gas line.

4. The method of detecting leakage from a gas line as well as the location of such leakage which includes the steps of determining more than once as to the dilution of an indicator gas in the gas line by an inflow of another gas and an expulsion of the indicator gas through a leak where an initial determination has shown a leak indicating dilution, each dilution taking place under similar conditions but during varying time intervals until a change in the rate of dilution as determined by a comparison of quantitative analyses of the indicator gas remaining after each dilution indicates the location of a leak.

5. The method of detecting leakage from a gas line as well as the location of such leakage which includes the steps of completely filling fractional portions of said line more than once beyond a filling point therein common to all portions with an indicator and determining whether dilution of such indicator occurs as a result of the escape of such indicator through a leak in the filled portion and the replacement thereof by gas, and repeating the step aforesaid from the same filling point in fractional portions of that part of the line in which the leak has been located by a previous step.

6. The method of detecting leakage of gas in service lines connected with a supply main which includes the steps of filling the line to be tested with an indicator gas differing from the gas in the service line by a characteristic capable of being quantitatively ascertained, immediately withdrawing the indicator gas from said line, repeating the filling and withdrawal operation allowing a given time interval to elapse between the filling and withdrawal steps, comparing the gas immediately withdrawn and the gas withdrawn after the given time interval to determine whether leakage has caused a dilution of the gas withdrawn after the time interval, and locating a point of leakage by repeating the filling and withdrawing operations in fractional sections of the line until an analytical comparison of the successively withdrawn gases shows a change in the rate of leakage per unit of time.

7. The method of detecting the rate of leakage of gas from a conducting line which includes the steps of filling a line connected with a supply main with an excess of an indicator medium while the gas in the supply main is moving to remove from the mouth of the line at the supply main all excess indicator medium flowing into the main from the line whereby accurately to fill the line to capacity with medium, and determining the extent of dilution of said indicator medium in said line by the flow of gas from said main into said line to replace the medium lost through a leak during a given interval of time.

8. The method of detecting leakage in a conducting line leading from a supply main which includes the steps of completely filling a section of the line between the supply main and a designated point with an indicator medium, and allowing a predetermined time interval to pass to enable gas from the supply main to cause the discharge of indicator medium through any leak with resulting entrance of gas into the line section, withdrawing gas and indicator medium for said line section in a predetermined volume at least equal to the volumetric capacity of the line section between the designated point and said supply main, and determining as to leakage by the dilution of the indicator medium in comparison with the indicator medium present in a mixture similarly obtained but at a different time interval.

MATTHEW E. BENESH.